Patented Apr. 7, 1931

1,799,303

UNITED STATES PATENT OFFICE

WALTER L. KULP, OF NEW HAVEN, CONNECTICUT

METHOD OF MAKING MILK PRODUCT

No Drawing.   Application filed April 12, 1929. Serial No. 354,693.

The present invention relates to an improved milk product and an improved method of making the same, and more especially to milk products containing *Bacillus acidophilus*.

There have been developed in recent years many milk products having a certain therapeutic value and suitable for use by persons who, for various reasons, are unable to use ordinary milk. Chief among these has been acidophilus milk, a sour milk product containing *Bacillus acidophilus*, which, by a long process of development and acclimatization has acquired the power of developing in milk.

In the usual preparation of acidophilus milk, fresh skimmed cow's milk is sterilized at substantially 115° C. and then cooled to at least 40° C. when it is inoculated with pure mixed strains of *Lacto-bacillus acidophilus* which have been isolated, for example, from the dejecta of persons in whom they have been established by lactose feeding and then developed by being grown for many generations and for long periods of time, generally a year, until they become acclimatized or accustomed to milk as their medium. The inoculum is a viable milk culture of the organism and from 5 to 10 cubic centimeters of the inoculum are used for each liter of milk treated. Complete coagulation of the casein in the milk is brought about in twenty-four hours, the incubation temperature being from 34° to 37° C. Not all of the strains of *Bacillus acidophilus* which are isolated establish themselves in a satisfactory manner in milk as a medium, and it is customary for this reason to cultivate several strains of the organism isolated at different times, the several strains being mixed in making acidophilus milk.

From a therapeutic view-point, it is considered that *Bacillus acidophilus* developed in milk as a medium for a long period is not as desirable as *Bacillus acidophilus* which has existed in this medium over a shorter period. From a commercial aspect, however, it has been found necessary to continue the long development of the bacillus in milk in order that after inoculation of the skimmed milk of the final product the development will be rapid and the casein coagulated within a reasonably short period of time, this period in the known processes being substantially twenty-four hours.

The improved milk product of the present invention bears a certain resemblance to acidophilus milk as now known but differs therefrom in many important particulars, both from a therapeutic view-point and from a commercial aspect. In the new product the *Bacillus acidophilus* develops more rapidly than in the known processes, and may be used after a shorter period of acclimatization, while upon inoculation of the final product complete coagulation of the casein is brought about in a shorter time. Furthermore, it has been considered necessary that a patient consume one quart of acidophilus milk per day in order that the complete predominance of *Bacillus acidophilus* over the other intestinal organisms may be maintained. It has often been rather difficult to persuade patients to continue to consume this amount of milk and usually but one out of every four or five persons who start the treatment continues it to the point where the treatment is of any considerable value. With the new product, the desired results may be obtained by the use of a smaller quantity of milk, with the result that the treatment becomes less irksome and is less apt to be discontinued.

Furthermore, the new product is more palatable than the usual acidophilus milk, which in taste is quite similar to buttermilk, and has always been objectionable to a large number of persons.

In producing my improved milk product, I isolate strains of *Bacillus acidophilus* in much the same manner as heretofore, and develop these strains in milk as a medium until I obtain a pure culture, but it is not necessary to continue the cultivation and acclimatization much beyond the point where it is determined that the culture is pure as has been essential heretofore. To skimmed milk or milk containing any desired amount of butter fat, I add a fruit or vegetable juice such as tomato juice, or yeast, or both, and thoroughly mix the same after which the mixture is practically sterilized and then cooled. After cooling, I inoculate the mixture with a pure culture of *Lacto-bacillus acidophilus*, after which the inoculated milk is held at a constant temperature until a curd is formed, or to use a more common expression, the milk has ripened. After ripening, the curd is thoroughly broken up by a mechanical stirring device and then filtered through a fine sieve to remove any clumps which may be present, and then bottled, and stored at a temperature of from 40° to 50° F.

The preparation of the improved milk product, after the strains of *Bacillus acidophilus* have been produced will be illustrated by the following specific example. To skimmed milk or milk containing any desired amount of butter fats, 1% by volume of concentrated tomato juice is added (tomato juice from which 90% or more of the water has been removed by any process which preserves the greater part of the vitamin content; as, for example, being evaporated under relatively low pressures and temperatures, and preferably in which one half of the titratable acidity has been neutralized with an alkali, for example, sodium hydroxide). After thorough mixing, by mechanically stirring, the mixture is practically sterilized by subjecting it to a temperature of between 205° and 210° F. for one and one-quarter hours, for example, in a double jacketed closed container, the necessary heat being supplied by steam which passes into the outer jacket of the container. After heating, the mixture is cooled to approximately 98° F. At this point, one-quarter per cent. by volume of pure culture of *Lacto-bacillus acidophilus* developed in milk is added to the mixture in the tank, and thoroughly mixed therewith. The inoculated mixture is held at 95 to 98° F. until a curd is formed (acidity approximately 0.065% normal), or as usually termed, the milk has ripened. This ripening process should require from ten to fifteen hours. After ripening, the curd is thoroughly broken up by means of a mechanical stirring device, then filtered through a fine sieve to remove any clumps which may be present, bottled, and stored at 40° to 50° F.

When yeast is used in place of the tomato or other similar vegetable juice, the process is much the same except that one-half per cent. by weight of pressed yeast cake is added to the initial milk in place of the tomato or other vegetable juice. When yeast is used in conjunction with vegetable juice, a less percentage is necessary. For example, I use one-half of one per cent. by volume of concentrated tomato juice and one-quarter per cent. by weight of pressed yeast cake. I consider the tomato juice superior to yeast as a means for improving the flavor of the product. The addition of a relatively small amount of tomato juice adds greatly to the palatability.

As a result of the improved process, the amount of pure culture starter required is decreased by 50% or more as compared to the usual acidophilus milk process, while the ripening time is decreased by more than 25%. The number of viable *Lacto-bacilli acidophilus* in the finished product are increased to a very considerable degree, more than 50%, so that a less amount of the finished product need be consumed in order to produce the desired result. The presence of the tomato or other vegetable juice in the finished product not only promotes a rapid growth of the organism but brings about a flavor of the finished product which is more acceptable to the average person, these juices or yeast also introducing vitamins B and C, which are highly desirable.

While I have described my improved process somewhat in detail and have given certain specific examples, it is not to be understood that the same is to be limited to all the details described, but is capable of modification and variation within the spirit of the invention and the scope of the appended claims.

What I claim is:—

1. The method of producing a milk product which comprises adding to the milk a vegetable juice, and then inoculating the same with strains of *Lacto-bacillus acidophilus* and permitting such strains to develop until coagulation of casein takes place.

2. The method of producing a sour milk product which comprises adding tomato juice to the milk, and then inoculating the same with strains of *Lacto-bacillus acidophilus* and permitting such strains to develop until coagulation of casein takes place.

3. The method of producing a sour milk product which comprises adding concentrated tomato juice to milk, and then inoculating the same with strains of *Lacto-bacillus acidophilus* and permitting such strains to develop until coagulation of casein takes place.

4. The method of making a sour milk product which comprises adding 1% by volume of concentrated vegetable juice to skimmed milk, stirring the mixture, subjecting it to a temperature of from 205° to 210° F. for substantially 1¼ hours, cooling the mixture to approximately 98° F., and then adding ¼% by volume of pure culture of *Lacto-bacillus acidophilus* developed in milk, thoroughly mixing the same, and holding the inoculated mixture at 95° to 98° F. until a curd is formed.

5. The method of making a sour milk product which comprises adding 1% by volume of concentrated tomato juice to skimmed milk, stirring the mixture, subjecting it to a temperature of from 205° to 210° F. for substantially 1¼ hours, cooling the mixture to approximately 98° F., and then adding ¼% by volume of pure culture of *Lacto-bacillus acidophilus* developed in milk, thoroughly mixing the same, and holding the inoculated mixture at 95° to 98° F. until a curd is formed.

6. The method of making a sour milk product which comprises adding concentrated vegetable juice to skimmed milk, stirring the mixture, practically sterilizing the same, cooling the mixture to approximately 98° F., inoculating the mixture with a pure culture of *Lacto-bacillus acidophilus* developed in milk, thoroughly mixing the same, and holding the inoculated mixture at 95° to 98° F. until a curd is formed.

7. The method of producing a sour milk product which comprises adding to milk a concentrated vegetable juice in which a substantial part of the titratable acidity has been neutralized, then inoculating the same with strains of *Lacto-bacillus acidophilus* and permitting such strains to develop until coagulation of the casein takes place.

8. The method of producing a sour milk product which comprises adding to milk concentrated tomato juice in which a substantial part of the titratable acidity has been neutralized, then inoculating the same with strains of *Lacto-bacillus acidophilus* and permitting such strains to develop until coagulation of casein takes place.

9. The method of producing a sour milk product which comprises adding to milk concentrated tomato juice in which substantially one-half of the titratable acidity has been neutralized, and then inoculating the same with strains of *Lacto-bacillus acidophilus*, and permitting such strains to develop until coagulation of casein takes place.

10. The method of making a sour milk product which comprises adding 1% by volume of concentrated tomato juice in which substantially one-half of the titratable acidity has been neutralized to skimmed milk, stirring the mixture, subjecting it to a temperature of from 205° to 210° F. for substantially 1¼ hours, cooling the mixture to approximately 98° F., and then adding ¼% by volume of pure culture of *Lacto-bacillus acidophilus* developed in milk, thoroughly mixing the same, and holding the inoculated mixture at 95° to 98° F. until a curd is formed.

In witness whereof, I have hereunto set my hand, this 9th day of April, 1929.

WALTER L. KULP.